(12) United States Patent
Montano et al.

(10) Patent No.: US 8,256,189 B2
(45) Date of Patent: Sep. 4, 2012

(54) HOT PUNCH ASSEMBLY FOR PROVIDING AN OPENING IN PACKAGING MATERIAL

(75) Inventors: Louis M. Montano, Perrysburg, OH (US); Larry Smith, Perrysburg, OH (US); William Witzler, Bowling Green, OH (US)

(73) Assignee: Lako Tool & Manufacturing, Inc., Perrysburg, OH (US)

( * ) Notice: Subject to any disclaimer, the term of this patent is extended or adjusted under 35 U.S.C. 154(b) by 411 days.

(21) Appl. No.: 12/542,851

(22) Filed: Aug. 18, 2009

(65) Prior Publication Data
US 2011/0041457 A1 Feb. 24, 2011

(51) Int. Cl.
*B65B 51/10* (2006.01)

(52) U.S. Cl. ........ 53/373.7; 53/134.1; 53/413; 493/226; 493/926

(58) Field of Classification Search ................ 53/134.1, 53/413, 451, 551, 552, 570, 373.7; 493/926, 493/226
See application file for complete search history.

(56) References Cited

U.S. PATENT DOCUMENTS

| 3,555,950 | A | * | 1/1971 | Gijsbers et al. | 83/171 |
| 4,131,245 | A | * | 12/1978 | Noda | 242/270 |
| 4,682,976 | A | * | 7/1987 | Martin et al. | 53/133.8 |
| 4,787,517 | A | * | 11/1988 | Martin | 383/203 |
| 5,009,632 | A | * | 4/1991 | Kruessel | 493/189 |
| 5,408,807 | A | * | 4/1995 | Lane et al. | 53/551 |
| 5,451,288 | A | * | 9/1995 | Smith et al. | 156/359 |
| 6,065,871 | A | * | 5/2000 | Warr | 383/10 |
| 6,486,442 | B2 | * | 11/2002 | Wheeler | 219/243 |
| 6,533,711 | B1 | * | 3/2003 | Anderson et al. | 493/213 |
| 6,539,692 | B1 | * | 4/2003 | Tobolka | 53/551 |
| 2005/0053313 | A1 | * | 3/2005 | Lucas et al. | 383/16 |
| 2005/0276521 | A1 | * | 12/2005 | Price | 383/10 |

* cited by examiner

*Primary Examiner* — Thanh Truong
(74) *Attorney, Agent, or Firm* — Harrity & Harrity, LLP

(57) ABSTRACT

A punch assembly is provided in a form, fill, and seal machine that provides a package that includes a sealed end portion and contains an article. The punch assembly includes a housing, and a heat sink provided in and retained by the housing, where the heat sink includes a punch tip that is to provide an opening in the sealed end portion of the package. The punch assembly also includes a coil heater contacting the heat sink to provide heat to the heat sink and the punch tip, where one or more air gaps are provided between the housing and the heat sink to prevent heat transfer from the heat sink to a seal jaw assembly of the form, fill, and seal machine.

25 Claims, 17 Drawing Sheets

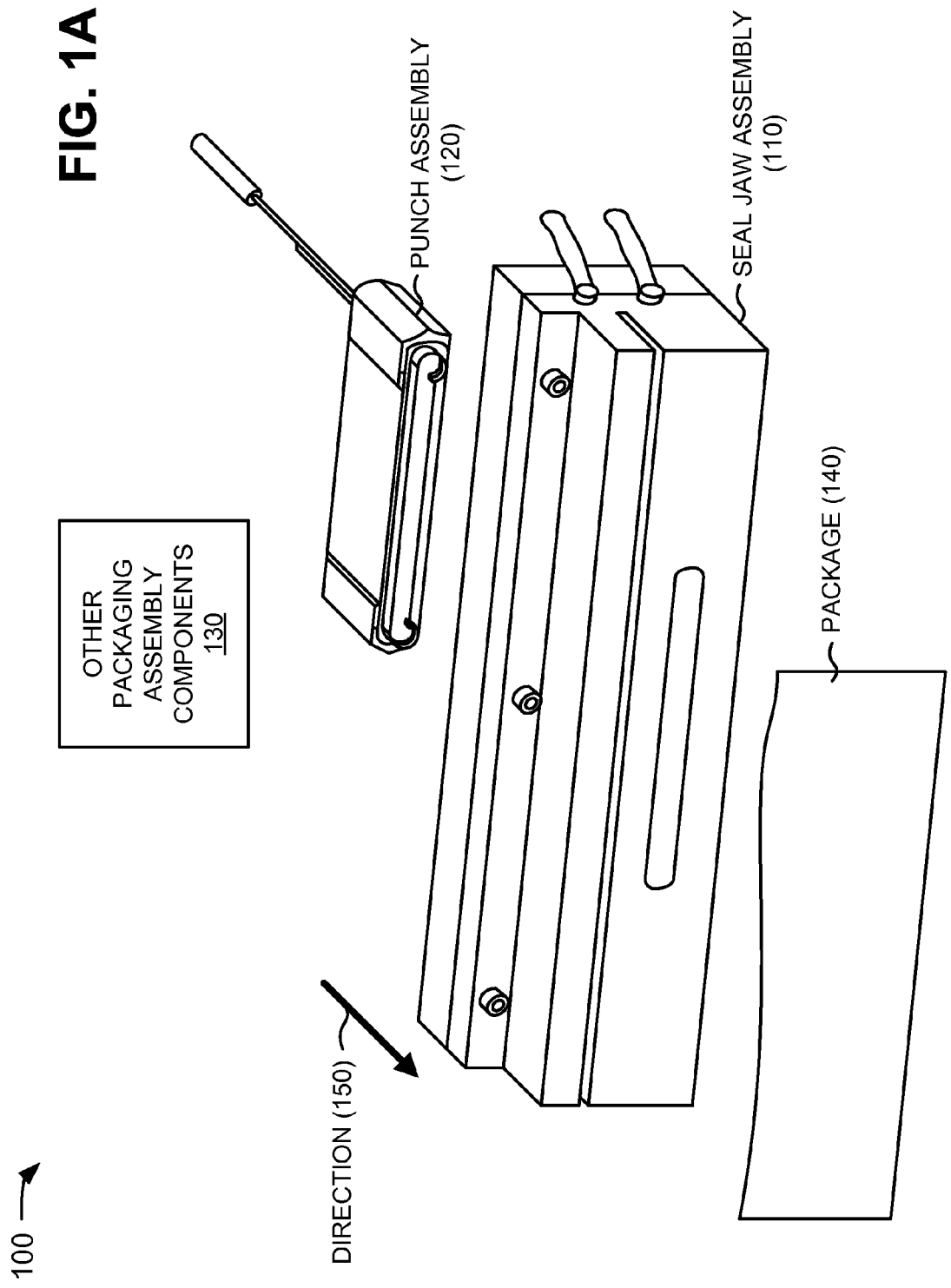

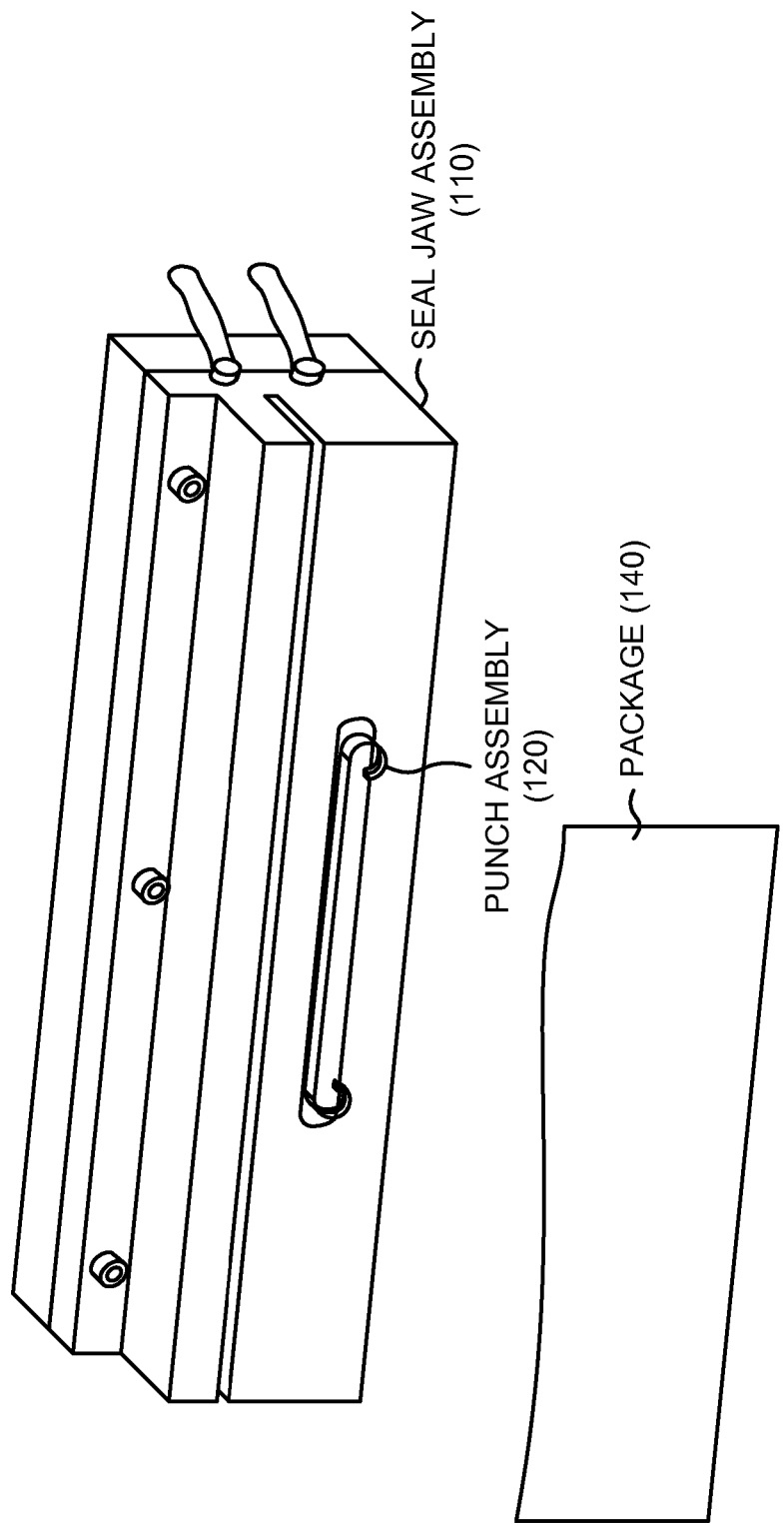

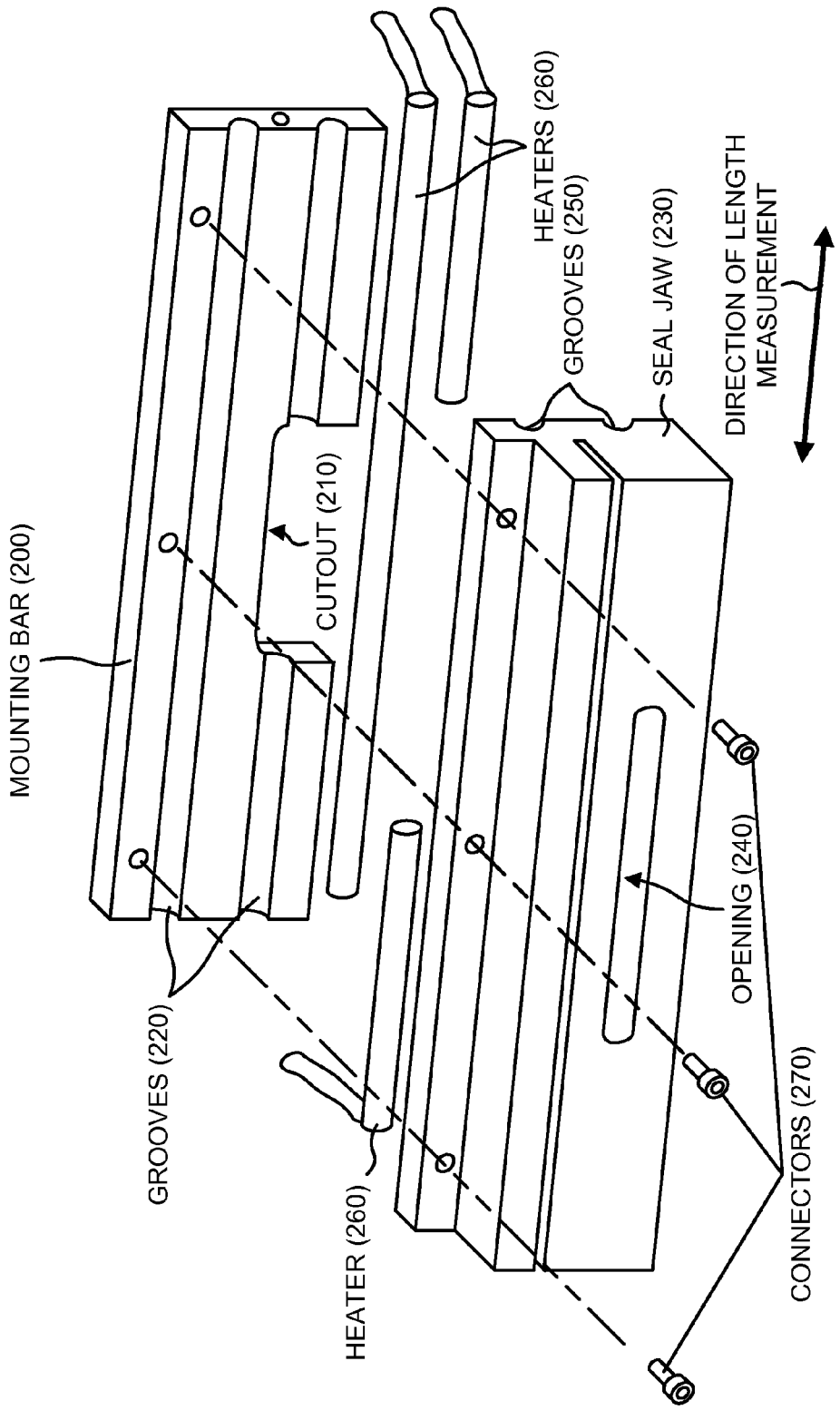

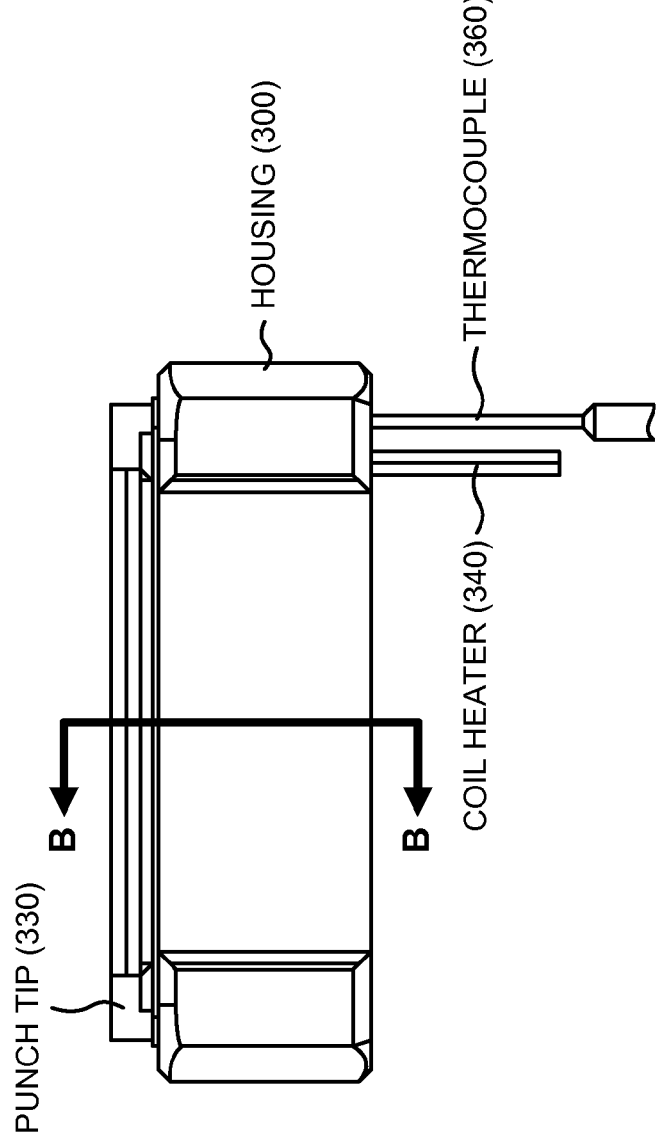

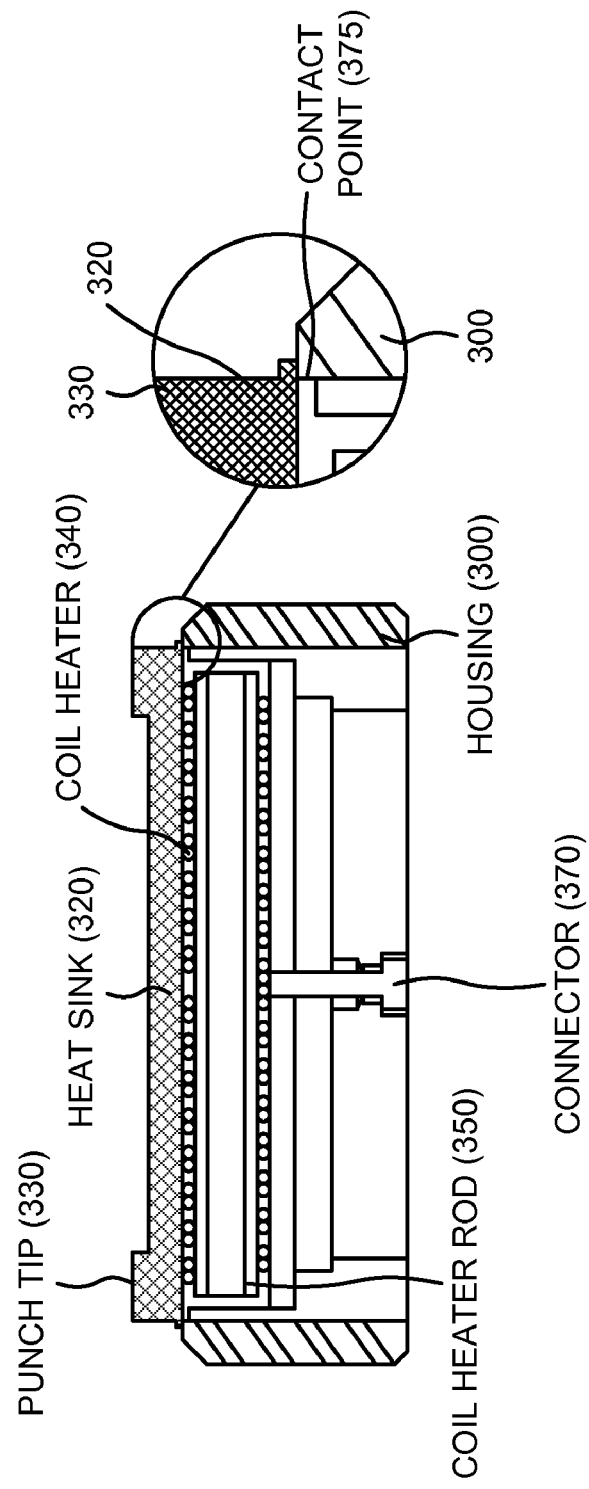

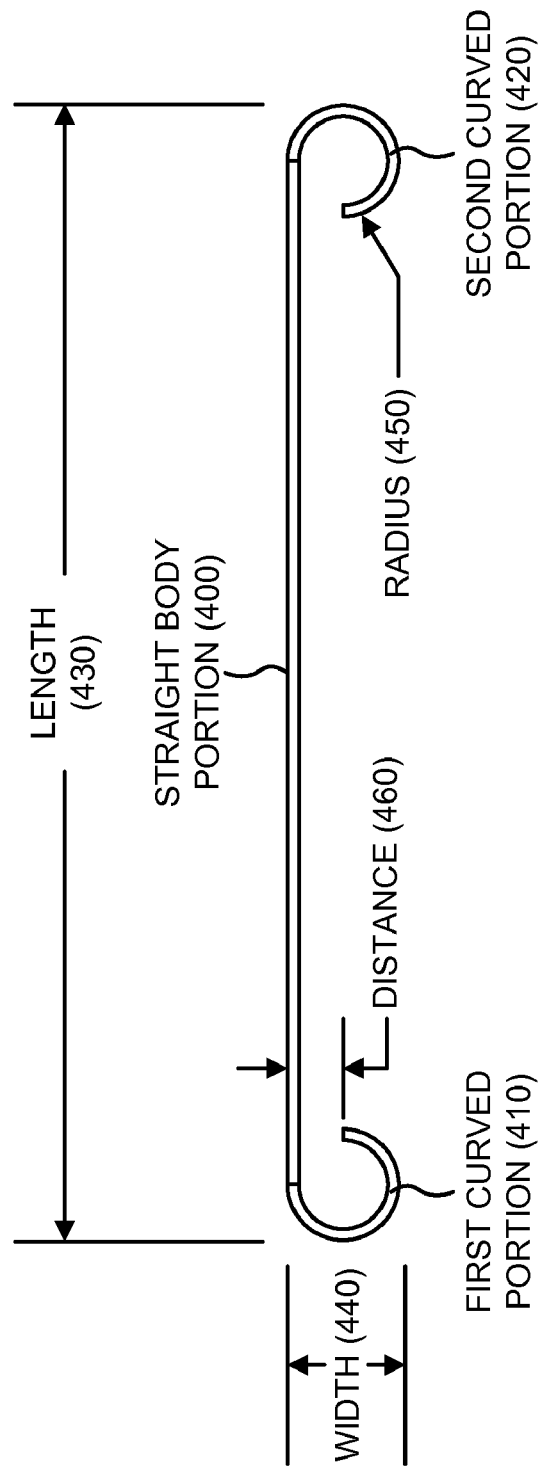

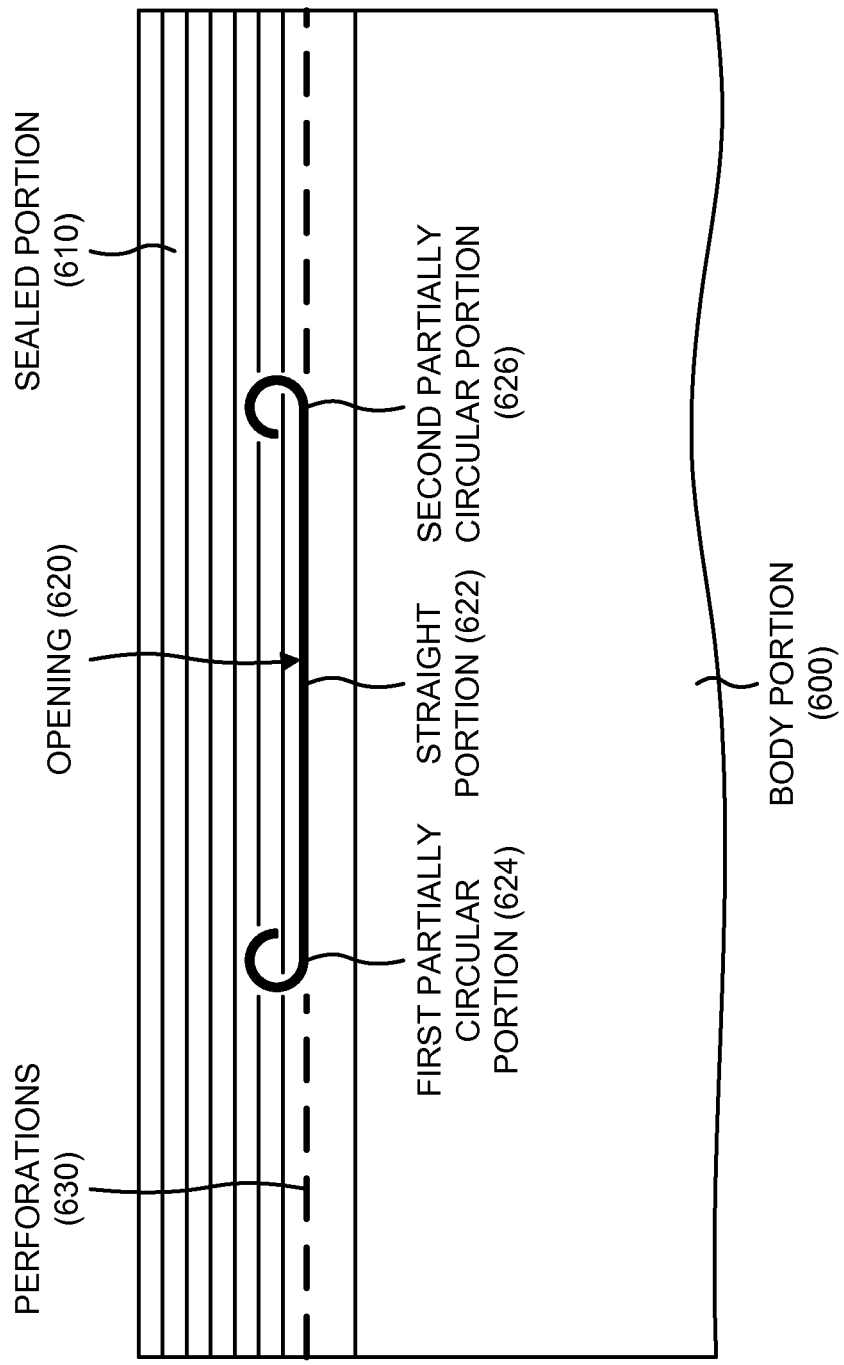

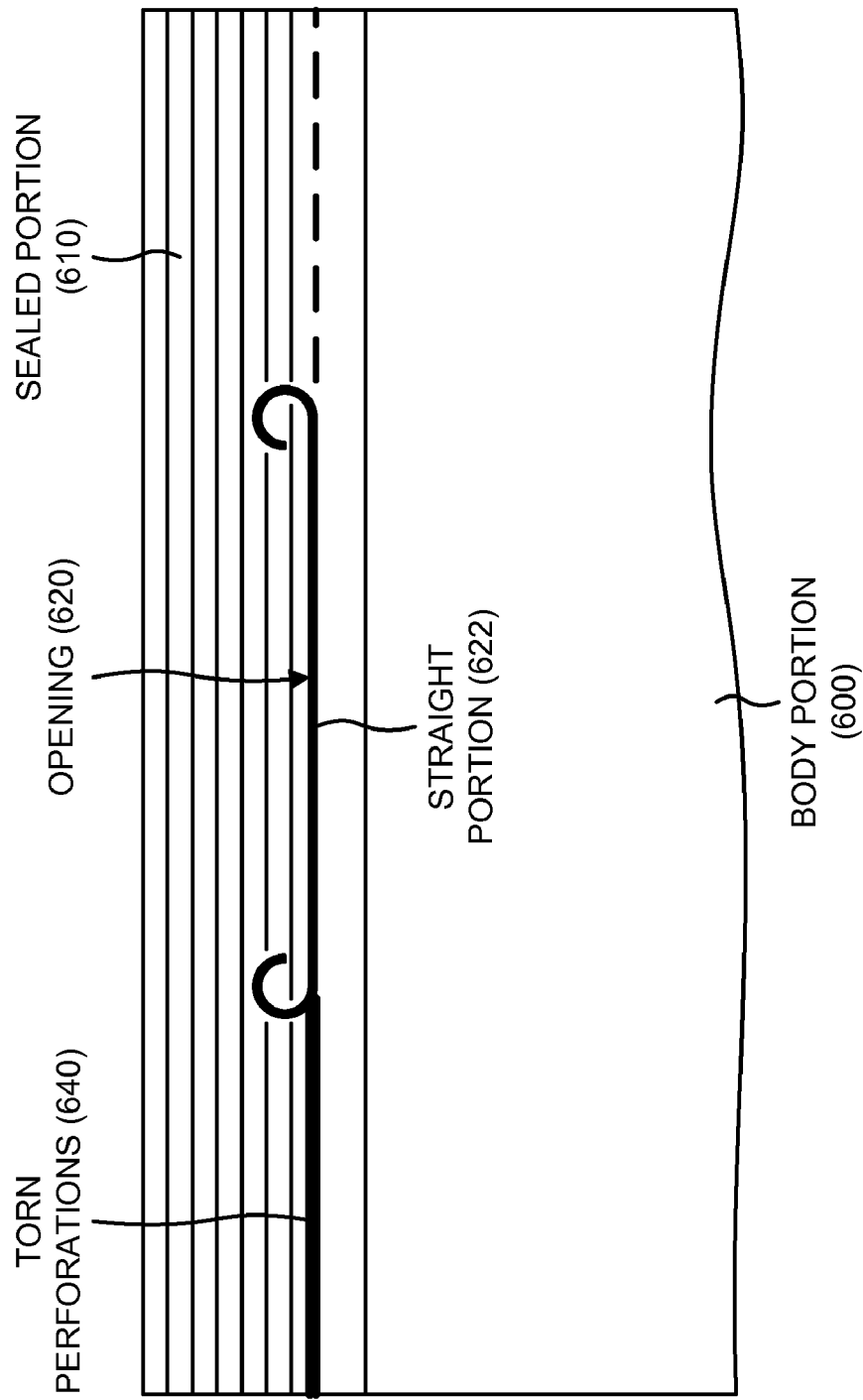

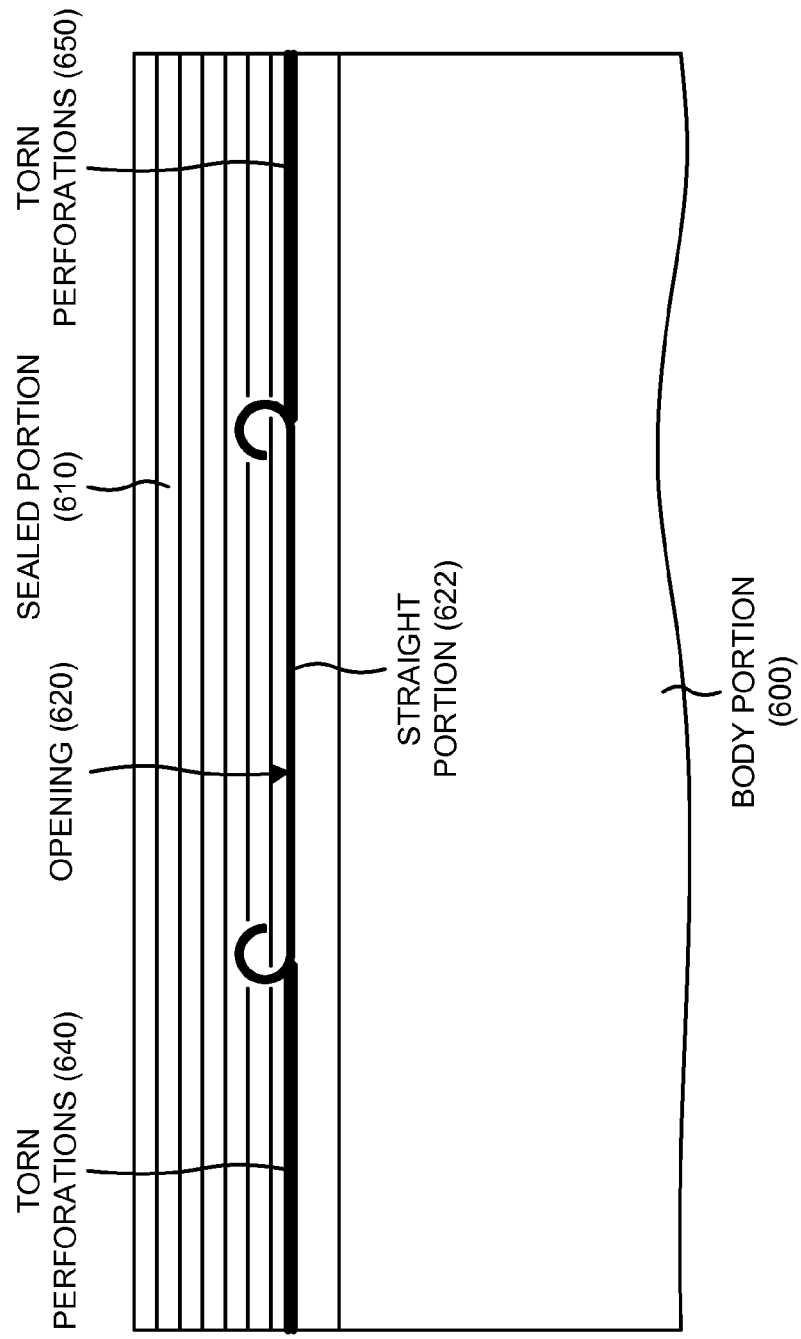

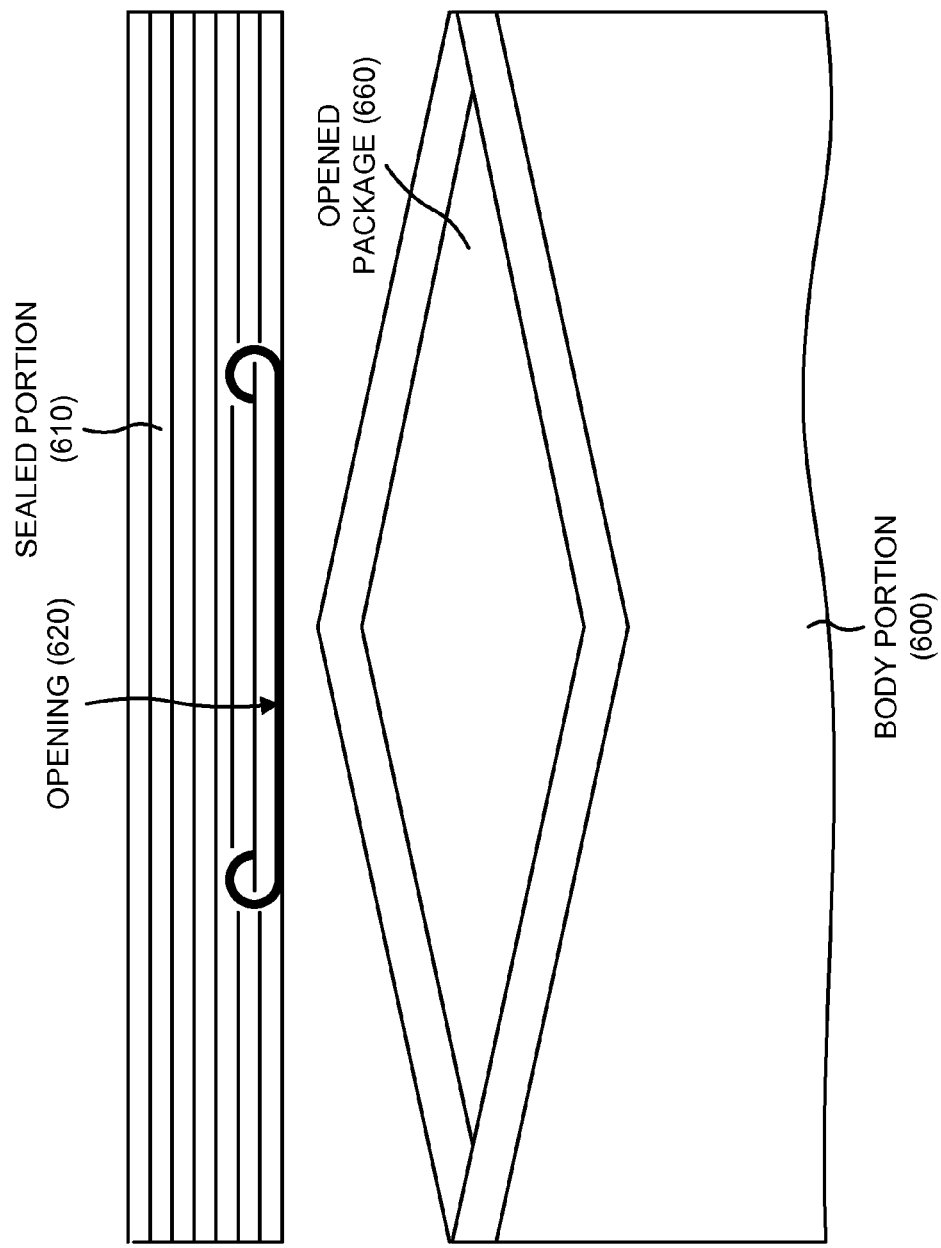

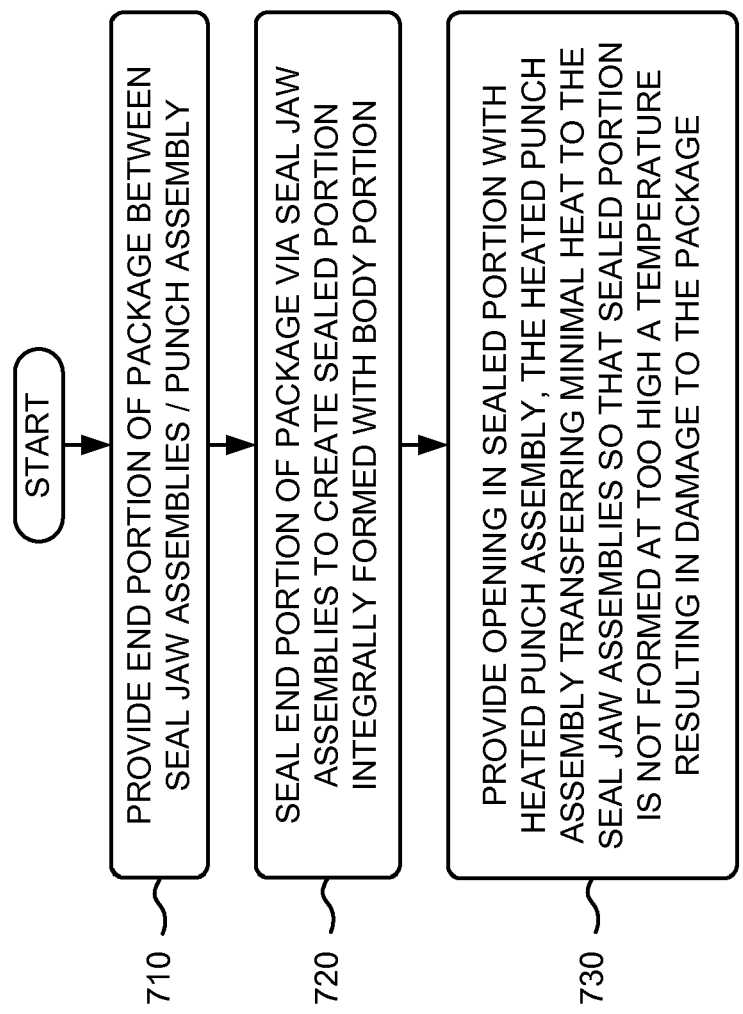

HOT PUNCH ASSEMBLY FOR PROVIDING AN OPENING IN PACKAGING MATERIAL

BACKGROUND

Some form, fill, and seal packaging machines sequentially fold a continuous sheet of packaging material about articles to be packaged, seal the packaging material about the articles, and cut the packaging material into individually sealed packages. More specifically, the sheet of packaging material is initially passed through a folding mechanism that continuously folds the packaging material over on itself to form an enclosure for spaced apart articles. The overlapping portions of the packaging material are then sealed along a continuous longitudinal seal via seal jaw assemblies. The folded sheet of packaging material is fed to a sealing and cutting assembly that seals leading and trailing edges of the package to be formed about the enclosed article and cuts the packaging material into multiple individually sealed packages. Examples of packages produced by this form, fill, and seal process are typically used for potato chips, snack bars, candy, cookies, cereals, household products, medical products, medicine, and/or other food or non-food products. The packages may range in size from small (e.g., one to two items weighing several ounces) to large (e.g., as many as a dozen items weighing ten to sixteen ounces).

Some of these packages may be hung on racks via holes provided in the packages. Such holes (or apertures) may be provided at an upper end of the package, referred to as a "header." The holes permit hanging or suspending of one or more packages upon an elongate spindle, or any one of multiple spindles, projecting from a vertically positioned peg board type display arrangement frequently seen in retail stores of various types. For example, snack food (e.g., potato chips, popcorn, peanuts, candies, etc.) packages may be hung on racks, via the holes, so that they may be displayed to customers. Typically, one or more holes may be provided in such packages by a mechanical or hot punch assembly of the form, fill, and seal packaging machine. It is usually desirable to create the holes in the package simultaneously with the sealing operation from the stand point of cost and efficiency. In order to accomplish this, a punch assembly is mounted in a seal jaw assembly so that it will contact the package at the same time as the seal jaw assemblies come together.

Thus, the creation of the holes in the package (e.g., via the hot punch assembly) is most efficiently accomplished at a particular temperature (e.g., between 650° Farenheit (F.) and 750° F.) which is usually higher than a temperature (e.g., between 250° F. and 300° F.) necessary to achieve sealing of the package (e.g., via the seal jaw assemblies). However, the hot punch assembly may transfer heat to the seal jaw assemblies resulting in zones or regions of serrations which are formed at too high a temperature.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 1A and 1B are diagrams illustrating isometric views of an exemplary system in which a punch assembly described herein may be implemented;

FIG. 2 is a diagram depicting an exploded, isometric view of a seal jaw assembly of the exemplary system illustrated in FIGS. 1A and 1B;

FIGS. 3A-3D are diagrams illustrating isometric (exploded), top, side, and front views, respectively, of the punch assembly of the exemplary system depicted in FIGS. 1A and 1B;

FIG. 3E is a diagram depicting a partial cross-sectional view of the punch assembly, taken along line A-A of FIG. 3C;

FIGS. 4A and 4B are diagrams depicting top and front views, respectively, of a punch of the punch assembly illustrated in FIGS. 3A-3D;

FIGS. 6A-6D are diagrams depicting an exemplary package capable of being formed by the exemplary system illustrated in FIGS. 1A and 1B; and FIG. 7 is a flowchart of an exemplary process for forming a sealed package according to implementations described herein.

DETAILED DESCRIPTION

Figure 3A:
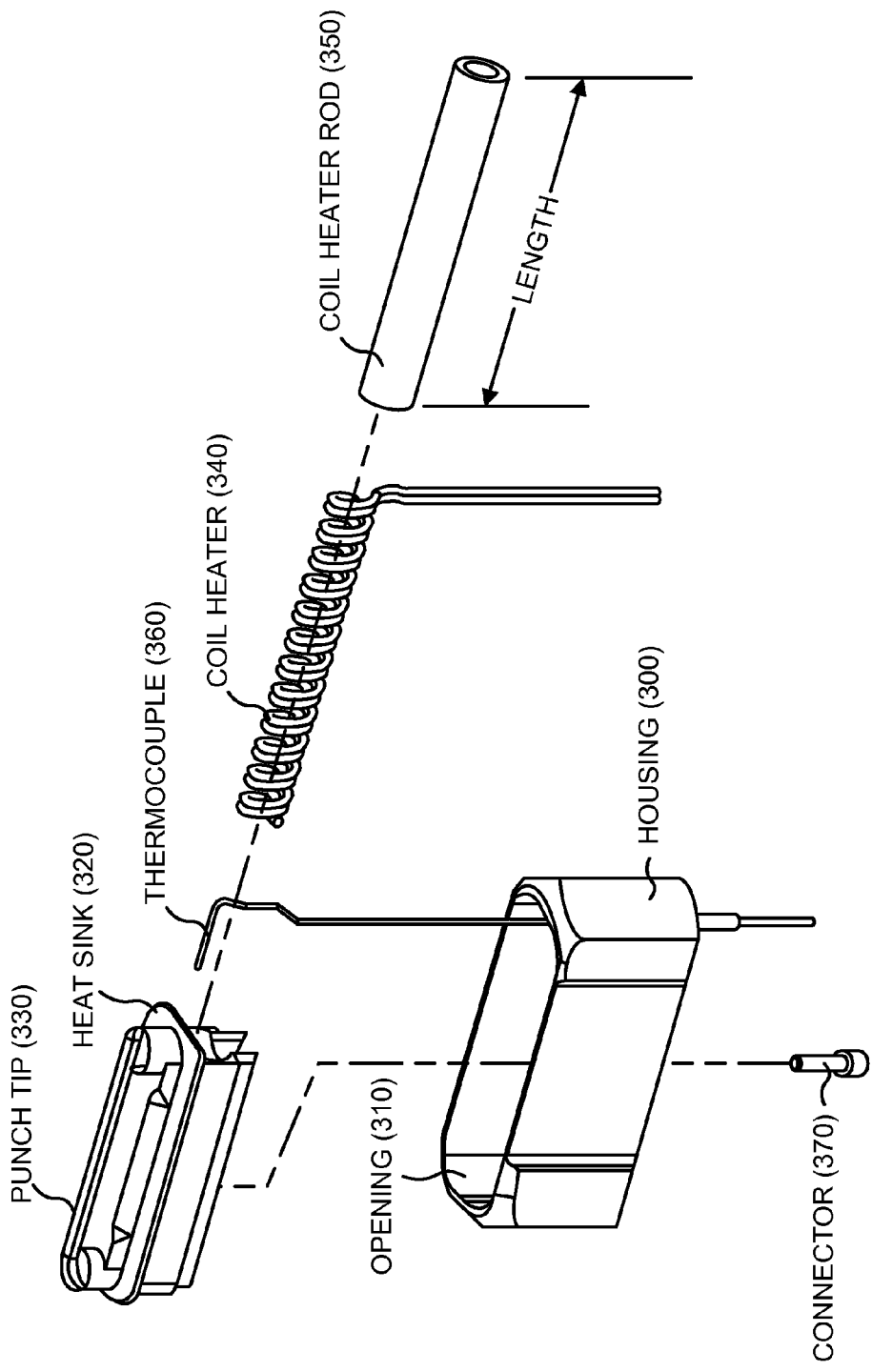
Figure 3B:
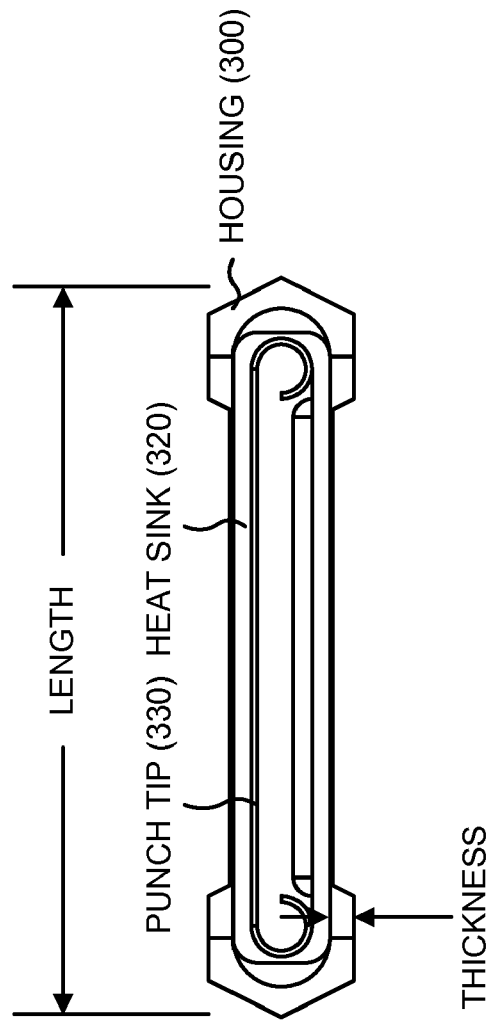

The following detailed description refers to the accompanying drawings. The same reference numbers in different drawings may identify the same or similar elements. Also, the following detailed description does not limit the invention.

Systems and/or methods described herein may provide a punch assembly for forming an opening in a sealed portion of a package. The opening may enable the package to be hung on a rack. For example, in one implementation, the punch assembly may propagate heat to a punch tip (e.g., that provides the opening) while inhibiting a flow of heat to seal jaw assemblies associated with the punch assembly. The punch assembly may create a peripheral region around the opening that is less susceptible to fracture and cut-through, otherwise leading to package failure and packages falling off the spindles. The punch assembly also may ensure a consistent seal of the package (e.g., by the seal jaw assemblies) with respect to hermetic conditions within the package itself (e.g. which may impact freshness, crispiness, taste, etc. of products contained in such packages).

Exemplary System

FIGS. 1A and 1B are diagrams illustrating isometric views of an exemplary system 100 in which a punch assembly described herein may be implemented. In one implementation, system 100 may correspond to a form, fill, and seal packaging machine. As shown in FIG. 1A, system 100 may include a seal jaw assembly 110, a punch assembly 120, other packaging assembly components 130, and a package 140.

Seal jaw assembly 110 may include a mechanism that heat seals an end portion of package 140 to form a closed package 140 around a product or article (not shown). For example, seal jaw assembly 110 may be aligned with and opposed by another seal jaw assembly 110 (not shown), package 140 may be provided between the opposed and aligned seal jaw assemblies 110, and seal jaw assemblies 110 may compress and heat seal an end portion of package 140. In one implementation, seal jaw assembly 110 may include one or more openings for receiving punch assembly 120. Seal jaw assembly 110 and punch assembly 120 may be moved in a direction 150 toward package 140, and may provide an opening in package 140, as described herein. Seal jaw assembly 110 may have a variety of shapes and sizes depending upon the size and shape of package 140. For example, in one implementation, seal jaw assembly 110 may be smaller in size if package 140 is small (e.g., a 1.5 ounce snack food bag), and may be larger in size if package 140 is large (e.g., a 20.0 ounce snack food bag). Seal jaw assembly 110 may be heated to temperature that ensures sealing of package 140 (e.g., a temperature approximately between 250° F. and 350° F.). Further details of seal jaw assembly 110 are provided below in connection with, for example, FIG. 2.

Punch assembly 120 may include a mechanism that provides an opening in a sealed portion of package 140. The opening provided in the sealed portion of package 140 may enable package 140 to be hung on a display rack (or receive a hook of the display rack). Punch assembly 120 may be provided (or mounted) in an opening provided in seal jaw assembly 110. Seal jaw assembly 110 and punch assembly 120 may be moved (e.g., via a linear movement mechanism, such as a linear actuator) in direction 150 toward package 140, and may provide the opening in the sealed portion of package 140. In one implementation, punch assembly 120 may be heated by a heater component provided in punch assembly 120 to a temperature that ensures an opening may be provided in package 140 (e.g., a temperature approximately between 650° F. and 750° F.). Punch assembly 120 may have a variety of shapes and sizes depending upon the size and shape of package 140. For example, in one implementation, punch assembly 120 may be smaller in size if package 140 is small (e.g., a 1.5 ounce snack food bag), and may be larger in size if package 140 is large (e.g., a 20.0 ounce snack food bag). Further details of punch assembly 120 are provided below in connection with, for example, FIGS. 3A-5.

Other packaging assembly components 130 may include one or more components typically provided in a form, fill, and seal packaging machine. For example, other packaging assembly components 130 may include another seal jaw assembly 110, a linear actuator to move seal jaw assembly 110 and punch assembly 120 in direction 150, mechanisms to intake packaging material (e.g., that makes up package 140) from rolls, mechanisms to form packages (e.g., package 140) from the packaging material, mechanisms to insert product into the formed packages, etc.

Package 140 may include any package capable of being produced by a form, fill, and seal process. For example, package 140 may include a package used for potato chips, snack bars, candy, cookies, cereals, household products, medical products, medicine, and/or other food or non-food products. Package 140 may be made from a variety of materials, such as plastic films, paper-based materials, a combination of plastic and other materials, etc. Package 140 may have a variety of shapes and sizes depending upon the size, shape, and amount of the product to be provided in package 140. For example, in one implementation, package 140 may be smaller in size (e.g., a 1.5 ounce snack food bag) if the size, shape, and/or amount of the product are small, and may be larger in size (e.g., a 20.0 ounce snack food bag) if the size, shape, and/or amount of the product are large.

As shown in FIG. 1B, punch assembly 120 may be provided (or mounted) in an opening of seal jaw assembly 110, and a portion of punch assembly 120 may protrude from seal jaw assembly 110. When seal jaw assembly 110 and punch assembly 120 are moved in direction 150 (FIG. 1A) toward package 140, the portion of punch assembly 120 may move ("punch" or burn) through package 140. When punch assembly 120 moves (or burns) through package 140, an opening may be provided in the sealed portion of package 140. The opening provided in the sealed portion of package 140 may enable package 140 to be hung on a display rack. However, because of the construction of punch assembly 120 (e.g., described below in connection with FIGS. 3A-5), heat may propagate to a punch tip (e.g., that provides the opening) of punch assembly 120 and a flow of heat to seal jaw assembly 110 may be inhibited. Punch assembly 120 may create a peripheral region around the opening that is less susceptible to fracture and cut-through, otherwise leading to package failure and packages falling off the spindles. Punch assembly 120 also may ensure a consistent seal of package 140 (e.g., by seal jaw assemblies 110) with respect to hermetic conditions within package 140 itself (e.g. which may impact freshness, crispiness, taste, etc. of products contained in such packages).

Although FIGS. 1A and 1B show exemplary components of system 100, in other implementations, system 100 may contain fewer, different, differently arranged, or additional components than depicted in FIGS. 1A and 1B. In still other implementations, one or more components of system 100 may perform one or more other tasks described as being performed by one or more other components of system 100.

Exemplary Seal Jaw Assembly Configuration

FIG. 2 is a diagram depicting an exploded, isometric view of seal jaw assembly 110. As illustrated, seal jaw assembly 110 may include a mounting bar 200 with a cutout 210 and grooves 220; a seal jaw 230 with an opening 240 and grooves 250; heaters 260; and connectors 270.

Mounting bar 200 may include a substantially rectangular-shaped bar made of a variety of materials, such as a metal or metal alloy (e.g., stainless steel, copper, iron, nickel, zinc, brass, bronze, aluminum, etc.), a thermally conductive material, a combination of the aforementioned materials, etc. Cutout 210 of mounting bar 200 may align and/or communicate with opening 240 of seal jaw 230, and may be sized and/or shaped to receive and provide a portion of punch assembly 120 therethrough. Grooves 220 of mounting bar 200 may align and/or communicate with grooves 250 of seal jaw 230 to form three cylindrically-shaped chambers. Each of the cylindrically-shaped chambers may be sized to receive and retain a corresponding one of heaters 260.

Seal jaw 230 may include a substantially rectangular-shaped block made of a variety of materials, such as a metal or metal alloy (e.g., stainless steel, copper, iron, nickel, zinc, brass, bronze, aluminum, etc.), a thermally conductive material, a combination of the aforementioned materials, etc. Opening 240 of seal jaw 230 may align and/or communicate with cutout 210 of mounting bar 200, and may be sized and/or shaped to receive and provide a portion of punch assembly 120 therethrough, as shown in FIG. 1B. Grooves 250 of seal jaw 230 may align and/or communicate with grooves 220 of mounting bar 200 to form the three cylindrically-shaped chambers described above.

Each of heaters 260 may include a substantially cylindrical-shaped rod made of a thermally conductive material, such as a metal or metal alloy (e.g., stainless steel, copper, iron, nickel, zinc, brass, bronze, aluminum, etc.). Heaters 260 may generate thermal energy that heats mounting bar 200 and/or seal jaw 230. The heated mounting bar 200 and/or seal jaw 230 may be used to partially melt and seal (e.g., upon cooling) an end portion of package 140 (FIGS. 1A and 1B). In one example, each of heaters 260 may include a diameter in a range of about 0.25 inches to about 0.5 inches. In another example, each of heaters 260 may include a diameter substantially equal to about 0.375 inches. Each of heaters 260 may include a length in a range of about six (6) inches to about 13.5 inches. Although FIG. 2 shows three heaters 260, in other implementations, seal jaw assembly 110 may include more or less than three heaters 260.

Each of connectors 270 may include a threaded bolt configured to engage corresponding threaded holes provided in mounting bar 200 and seal jaw 230. Connectors 270 may connect mounting bar 200 to seal jaw 230 to form seal jaw assembly 110. Alternatively and/or additionally, one or more of connectors 270 may be replaced with a variety of other connection mechanisms, such as screws, adhesives, glue, solder, and/or similar connection mechanisms. Although FIG. 2 shows three connectors 270, in other implementations, seal jaw assembly 110 may include more or fewer than three connectors 270.

Although FIG. 2 shows exemplary components of seal jaw assembly 110, in other implementations, seal jaw assembly 110 may contain fewer, different, differently arranged, or additional components than depicted in FIG. 2. In still other implementations, one or more components of seal jaw assembly 110 may perform one or more other tasks described as being performed by one or more other components of seal jaw assembly 110.

Exemplary Punch Assembly Configuration

FIGS. 3A-3D are diagrams illustrating isometric (exploded), top, side, and front views, respectively, of punch assembly 120. As illustrated in FIG. 3A, punch assembly 120 may include a housing 300 with an opening 310 formed therethrough; a heat sink 320 with a punch tip 330; a coil heater 340; a coil heater rod 350; a thermocouple 360; and a connector 370.

Housing 300 may include a substantially rectangular-shaped block made of a variety of materials, such as a metal or metal alloy (e.g., stainless steel, copper, iron, nickel, zinc, brass, bronze, aluminum, etc.), a thermally conductive material, a non-thermally conductive material, a combination of the aforementioned materials, etc. Opening 310 may be provided through housing 300 and may be sized and/or shaped to receive and/or retain heat sink 320. In one example, housing 300 may include a thickness (FIG. 3B) in a range of about 0.1 inches to about 0.3 inches. In another example, housing 300 may include a thickness substantially equal to about 0.25 inches. In still another example, housing 300 may include a length (FIG. 3B) substantially equal to about 2.375 inches.

Heat sink 320 may include a substantially rectangular-shaped block made of a variety of materials, such as a metal or metal alloy (e.g., stainless steel, copper, iron, nickel, zinc, brass, bronze, aluminum, etc.), a thermally conductive material, a combination of the aforementioned materials, etc. Heat sink 320 may be sized and/or shaped to be received and retained in opening 310 of housing 300. As shown in FIG. 3A, a bottom portion of heat sink 320 may receive and/or retain coil heater 340, coil heater rod 350, and thermocouple 360 therein. Coil heater 340 and coil heater rod 350 may generate thermal energy that heats heat sink 320 and punch tip 330.

Punch tip 330 may connect to (or may be integrally formed with) and extend away from heat sink 320. Punch tip 330 may be shaped to provide an opening, in the sealed portion of package 140, which may enable package 140 to be hung on a display rack. Punch tip 330 may be made of a variety of materials, such as a metal or metal alloy (e.g., stainless steel, copper, iron, nickel, zinc, brass, bronze, aluminum, etc.), a thermally conductive material, a combination of the aforementioned materials, etc. In one implementation, punch tip 330 may be heated by coil heater 340 and coil heater rod 350, and the heated punch tip 330 may provide and/or burn the opening in the sealed portion of package 140. Further details of punch tip 330 are provided below in connection with, for example, FIGS. 4A and 4B.

Coil heater 340 may include a device that generates heat by providing an electric current through numerous coils, causing the coils to glow and generate heat. The number of coils of coil heater 340 may be increased or decreased depending on the size of punch assembly 120. In one example, the coils of coil heater 340 may be arranged in a substantially cylindrical shape. In another example, coil heater 340 may include a one-hundred and twenty (120) volt-two-hundred and fifty (250) watt coil heater. Coil heater 340 may be made from a variety of materials, such as a metal or metal alloy (e.g., stainless steel, copper, iron, nickel, zinc, brass, bronze, aluminum, etc.), a thermally conductive material, a combination of the aforementioned materials, etc. Coil heater 340 may generate thermal energy that heats coil heater rod 350 along its entire length, and may generate thermal energy that uniformly heats heat sink 320 and punch tip 330. The heated punch tip 330 may provide and/or burn the opening in the sealed portion of package 140. In contrast, conventional heaters (e.g., cartridge heaters) do not generate heat along their entire lengths, but rather include cold portions at their ends. As further shown in FIG. 3A, coil heater 340 and coil heater rod 350 may enter housing 300 from a side portion of housing 300.

Coil heater rod 350 may include a substantially cylindrical-shaped hollow rod made of a thermally conductive material, such as a metal or metal alloy (e.g., stainless steel, copper, iron, nickel, zinc, brass, bronze, aluminum, etc.). Coil heater rod 350 may transfer the thermal energy received from coil heater 340 to heat sink 320 and punch tip 330. In one example, coil heater rod 350 may include a diameter in a range of about 0.25 inches to about 0.5 inches. In another example, coil heater rod 350 may include a diameter substantially equal to about 0.3125 inches. Coil heater rod 350 may include a length in a range of about two (2) inches to about three (3) inches.

Thermocouple 360 may include a thermoelectric device that measures temperatures accurately. In one example, thermocouple 360 may include two dissimilar metals joined so that a potential difference generated between points of contact of the dissimilar metals may provide a measure of the temperature difference between the points. In one exemplary implementation, thermocouple 360 may include a Type J thermocouple. Thermocouple 360 may enable system 100 (FIGS. 1A and 1B) to monitor a temperature of heat sink 320 and/or punch tip 330, and to control the temperature of heat sink 320 and/or punch tip 330 (e.g., via coil heater 340). For example, if thermocouple 360 senses that a temperature of heat sink 320 is too high, system 100 may reduce the amount of thermal energy produced by coil heater 340, which, in turn, may reduce the temperature of heat sink 320.

Connector 370 may include a threaded bolt that engages with a corresponding threaded hole provided in heat sink 320. Connector 370 may connect housing 300 to heat sink 320. Alternative and/or additionally, connector 370 may be replaced with a variety of other connection mechanisms, such as screws, adhesives, glue, solder, and/or similar connection mechanisms. Although FIG. 3A shows one connector 370, in other implementations, punch assembly 120 may include more than one connector 370.

As shown in the top view of punch assembly 120 (FIG. 3B), heat sink 320 may be provided in housing 300 (e.g., in opening 310 of housing 300), and punch tip 330 may be provided on a front face of heat sink 320. As shown in the side view of punch assembly 120 (FIG. 3C), punch tip 330 may extend away from the front face of heat sink 320 and from housing 300. As shown in the front view of punch assembly (FIG. 3D), a portion of coil heater 340 may extend away from housing 300 and may connect to a power supply (not shown), and a portion of thermocouple 360 may extend away from housing 300 and may connect to a control device (not shown) associated with system 100 (FIGS. 1A and 1B).

Figure 3C:
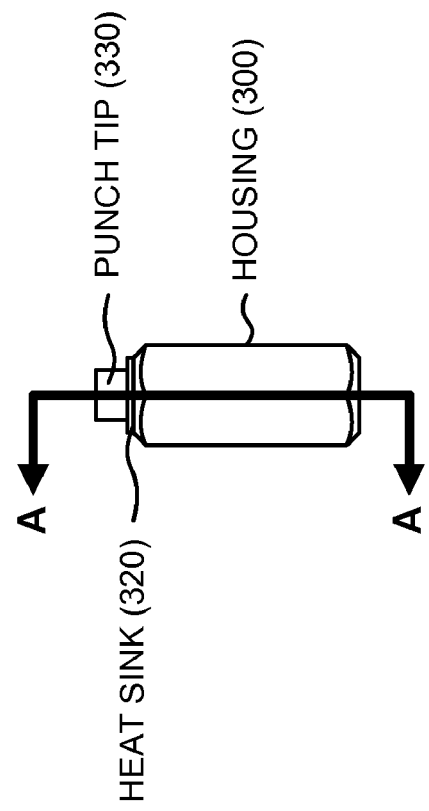

FIG. 3E is a diagram depicting a partial cross-sectional view of punch assembly 120, taken along line A-A of FIG. 3C. As shown in FIG. 3E, connector 370 may connect housing 300 and heat sink 320 together. Coil heater rod 350 may provide structural support for the coils of coil heater 340. The coils of coil heater 340 may directly contact the surface of coil heater rod 350, and may generate thermal energy that uniformly heats coil heater rod 350 along its entire length and uniformly heats heat sink 320 and punch tip 330. The coils of coil heater 340 may not directly contact the surface of heat sink 320 (e.g., so that coil heater 340 and coil heater rod 350 may be easily inserted in housing 300. However, any air spaces provided between the coils of coil heater 340 and heat sink 320 may be filled with a thermally conductive compound (e.g., a silver solder material, a commercially available material (Durabond) formed of an aluminum epoxy blend, etc.). For example, the thermally conductive compound may be coated on the inside of coil heater 340, and coil heater rod 350 may then be inserted within coil heater 340. The outside of coil heater 340 may be coated with the thermally conductive compound, and an inside diameter of heat sink 320 may also be coated with the thermally conductive compound. Coil heater 340 and coil heater rod 350 may be provided within housing 300, adjacent to heat sink 320 (e.g., in the position shown in FIG. 3E). Application of the thermally conductive compound may provide a very tight fit between coil heater 340 and heat sink 320, and may minimize or eliminate air spaces.

Insulating air spaces or voids may be provided between coil heater 340/coil heater rod 350 and housing 300. The insulating air spaces may provide insulating regions that inhibit the flow of heat across the air spaces to the surrounding housing 300. As further shown in FIG. 3E, heat sink 320 may have minimal contact (e.g., via a contact point 375) with housing 300, which may minimize conduction of substantial heat from heat sink 320 to housing 300. Such an arrangement may prevent housing 300 from being heated to a temperature that may cause seal jaw assembly 110 to be heated to an undesirable temperature (e.g., a temperature that may cause damage to package 140).

Figure 3F:
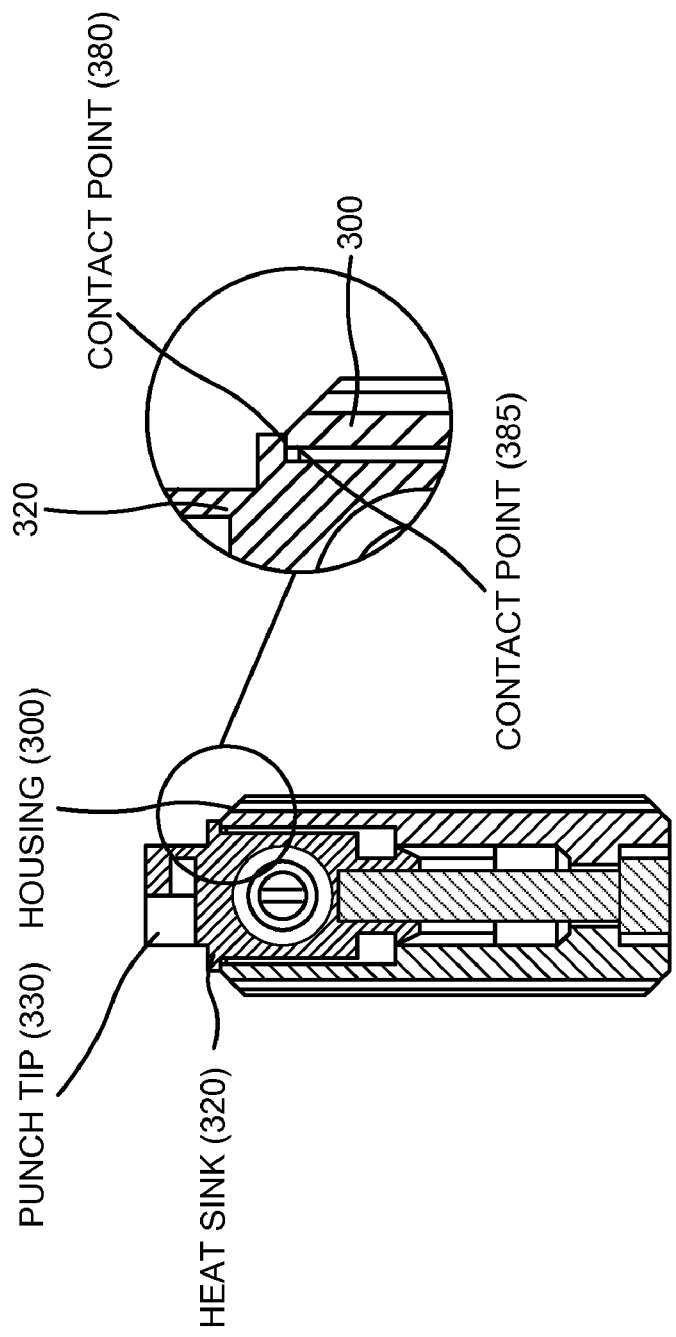
FIG. 3F is a diagram illustrating a partial cross-sectional view of the punch assembly, taken along line B-B of FIG. 3D.

FIG. 3F is a diagram illustrating a partial cross-sectional view of punch assembly 120, taken along line B-B of FIG. 3C. As shown in FIG. 3F, heat sink 320 may extend into housing 300 to a depth that enables heat sink 320 to create a path for heat to move toward punch tip 320 rather than toward housing 300. Insulating air spaces or voids may be provided between heat sink 320 and housing 300. The insulating air spaces may provide insulating regions that inhibit the flow of heat across the air spaces to the surrounding housing 300. As further shown in FIG. 3F, heat sink 320 may have minimal contact (e.g., via contact points 380 and 385) with housing 300, which may minimize conduction of substantial heat from heat sink 320 to housing 300. Such an arrangement may prevent housing 300 from being heated to a temperature that may cause seal jaw assembly 110 to be heated to an undesirable temperature (e.g., a temperature that may cause damage to package 140).

Although FIGS. 3A-3F show exemplary components of punch assembly 120, in other implementations, punch assembly 120 may contain fewer, different, differently arranged, or additional components than depicted in FIGS. 3A-3F. In still other implementations, one or more components of punch assembly 120 may perform one or more other tasks described as being performed by one or more other components of punch assembly 120.

Exemplary Punch Tip Configuration

Figure 4B:
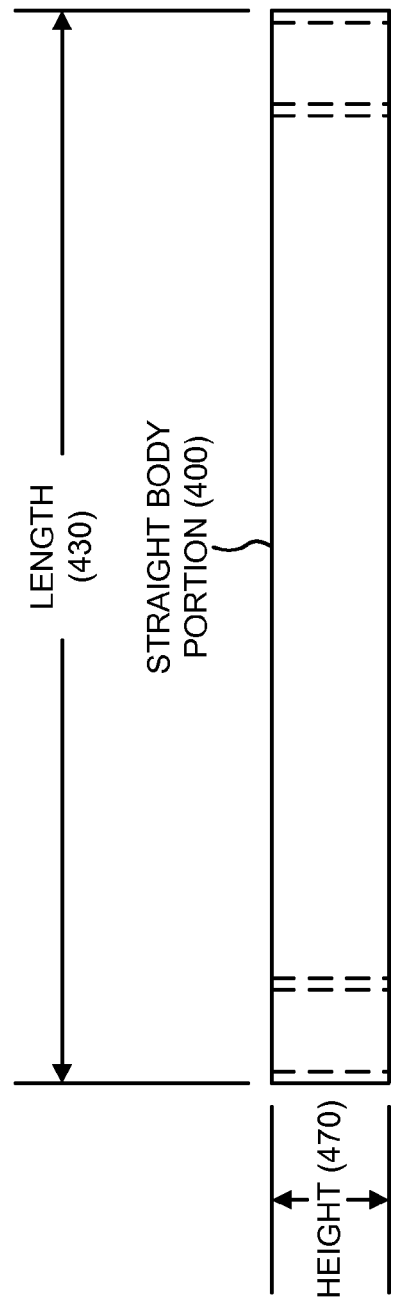

FIGS. 4A and 4B are diagrams depicting top and front views, respectively, of punch tip 330. As illustrated in FIG. 4A, punch tip 330 may include a straight (or substantially straight) body portion 400 integrally connected with a first curved portion 410, at one end, and with a second curved portion 420, at another end. In one implementation, the thicknesses of straight body portion 400, first curved portion 410, and second curved portion 420 may vary depending on a thickness of the opening to be provided in the end portion of package 140.

As further shown in FIG. 4A, punch tip 330 may include a length 430 and a width 440. Length 430 and width 440 may vary depending on the size of the opening to be provided in the end portion of package 140. For example, length 430 may be in a range of about 2.25 inches to about 2.75 inches, and width 440 may be in a range of about 0.125 inches to about 0.5 inches. In another example, length 430 may be substantially equal to about 2.375 inches, and width 440 may be substantially equal to about 0.25 inches.

First curved portion 410 and second curved portion 420 may be substantially circular in shape and may include a radius 450. Radius 450 may vary depending on the size of the opening to be provided in the end portion of package 140. For example, radius 450 may be about 0.125 inches to about 0.5 inches. In another example, radius 450 may be substantially equal to about 0.25 inches. Based on dimensions of radius 450, straight body portion 400 may be in a range of about 1.875 inches to about 2.25 inches, or may be substantially equal to about 2.125 inches.

As shown in FIG. 4B, punch tip 330 may include a height 470. Height 470 may vary depending on the thickness of the end portion of package 140. For example, height 470 may be in a range of about 0.5 inches to about 1.5 inches. In another example, height 470 may be substantially equal to about 0.75 inches.

Although FIGS. 4A and 4B show exemplary components of punch tip 330, in other implementations, punch tip 330 may contain fewer, different, differently arranged, or additional components than depicted in FIGS. 4A and 4B. For example, in one exemplary implementation, first curved portion 410 and second curved portion 420 may be replaced with first and second portions that provide circular (or other shaped) holes in package 140.

Exemplary System Assembly

Figure 5:
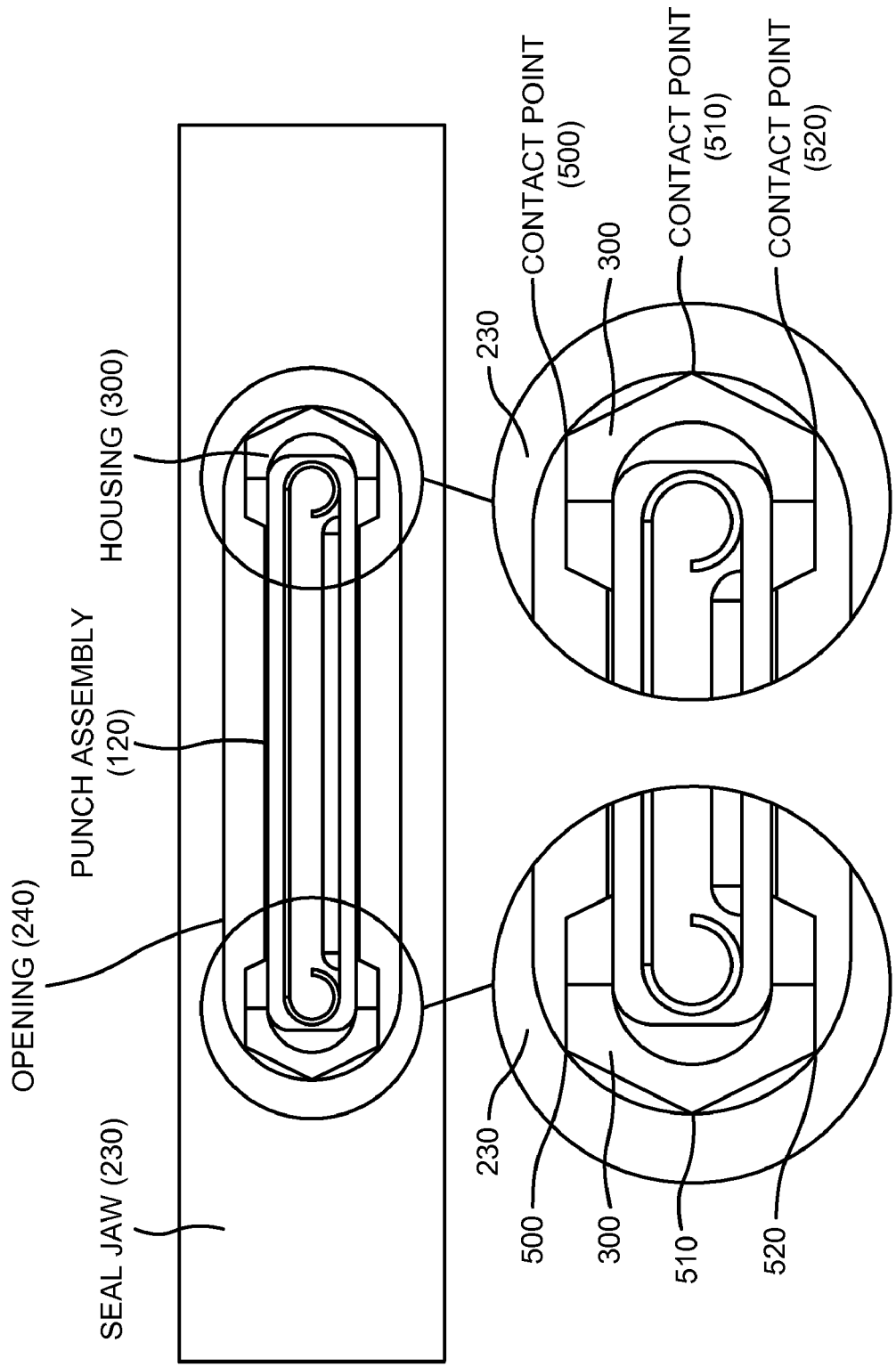
FIG. 5 is a diagram illustrating an interrelation between the punch assembly and the seal jaw assembly of the exemplary system depicted in FIGS. 1A and 1B.

FIG. 5 is a diagram illustrating an interrelation between punch assembly 120 and seal jaw assembly 110 (e.g., of system 100). As shown in FIG. 5, punch assembly 120 may be mounting in opening 240 of seal jaw 230 (e.g., of seal jaw assembly 110). In one example, punch assembly 120 may be mounted in opening 240 of seal jaw so that insulating air spaces or voids may be provided between punch assembly and seal jaw 230. The insulating air spaces may provide insulating regions that inhibit the flow of heat across the air spaces from punch assembly 120 to the surrounding seal jaw 230. As further shown in FIG. 5, punch assembly 120 may have minimal contact (e.g., via contact points 500, 510, and 520 of housing 300) with seal jaw 230, which may minimize conduction of substantial heat from housing 300 of punch assembly 120 to seal jaw 230. Such an arrangement may prevent punch assembly 120 from heating seal jaw 230 to a temperature that may cause seal jaw assembly 110 to be heated to an undesirable temperature (e.g., a temperature that may cause damage to package 140).

Although FIG. 5 shows exemplary components (and inter-relations of components) of system 100, in other implementations, system 100 may contain fewer, different, differently arranged, or additional components than depicted in FIG. 5. In still other implementations, one or more components of system 100 may perform one or more other tasks described as being performed by one or more other components of system 100.

Exemplary Package Configuration

FIGS. 6A-6D are diagrams illustrating a package (e.g., package 140) capable of being formed by exemplary system 100 (e.g., via punch tip 330). As shown in FIG. 6A, package 140 may include a body portion 600 integrally connected with a sealed portion 610.

Body portion 600 may include a portion of package 140 that is not sealed and contacts a portion of (or all) the product provided in package 140. In one implementation, body portion 600 may include a portion of package 140 that is not engaged by seal jaw assembly 110 and punch assembly 120 of system 100.

Sealed portion 610 may include a portion of package 140 that is sealed and does not contact (or partially contacts) the product provided in package 140. In one implementation, sealed portion 610 may include a portion of package 140 that is engaged and heat sealed by seal jaw assembly 110 of system 100. Sealed portion 610 may also be engaged by punch assembly 120 of system 100, and punch assembly 120 may form an opening 620 in sealed portion 610. As further shown in FIG. 6A, opening 620 may include a straight portion 622 integrally formed with a first partially circular portion 624 and a second partially circular portion 626. Straight portion 622 may include the same or substantially the same size and/or shape as straight body portion 400 of punch tip 330 (FIG. 4A). First partially circular portion 624 may include the same or substantially the same size and/or shape as first curved portion 410 of punch tip 330 (FIG. 4A). Second partially circular portion 626 may include the same or substantially the same size and/or shape as second curved portion 420 of punch tip 330 (FIG. 4A). In one example, first partially circular portion 624 and second partially circular portion 626 may enable package 140 to be hung on a display rack. In another example, opening 620 may enable sealed portion 610 of package 140 to be opened from left to right (or from right to left) without tearing package 140 down towards body portion 600 (e.g., towards a product contained in package 140). In still another example, opening 620 may be vertically inverted so that straight portion 622 is closer to the top of package 140 than first and second partially circular portions 624/626.

As further shown in FIG. 6A, one or more perforations 630 may be provided on either side of opening 620. Perforations 630 may be formed by a perforation punch assembly associated with seal jaw assembly 110. Alternatively, heat sink 320 of punch assembly 120 may include a perforation punch that forms perforations 630.

As shown in FIG. 6B, if a user of package 140 wishes to access the product contained in package 140 and/or wishes to open package 140, the user may tear sealed portion 610 of package 140 along one set of perforations 630 to create torn perforations 640. Torn perforations 640 may adjoin to opening 620 (e.g., straight portion 622 of opening 620) so that a majority of sealed portion 610 may be opened by via torn perforations 640 and opening 620.

As shown in FIG. 6C, the user may tear sealed portion 610 of package 140 along the other perforations 630 to create torn perforations 650. Torn perforations 630 and torn perforations 650 may adjoin to opening 620 (e.g., straight portion 622 of opening 620) so that sealed portion 610 (or a portion of sealed portion 610) may be separated from body portion 600 of package 140. Once sealed portion 610 is separated from body portion 600, the user may open body portion 600 to create an opened package 660, as shown in FIG. 6D. The user may access the product contained in package 140 via opened package 660.

Although FIGS. 6A-6D show exemplary components of package 140, in other implementations, package 140 may contain fewer, different, differently arranged, or additional components than depicted in FIGS. 6A-6D.

Exemplary Process

FIG. 7 is a flowchart of an exemplary process 700 for forming a sealed package according to implementations described herein. In one implementation, process 700 may be performed by system 100. In other implementations, some or all of process 700 may be performed by another device or group of devices (e.g., associated with system 100).

As shown in FIG. 7, process 700 may begin with providing an end portion of a package between seal jaw assemblies and/or a punch assembly associated with one of the seal jaw assemblies (block 710), and sealing the end portion of the package via the seal jaw assemblies to create a sealed portion integrally formed with a body portion (block 720). For example, in implementations described above in connection with FIG. 1A, seal jaw assembly 110 may include a mechanism that heat seals an end portion of package 140 to form a closed package 140 around a product. In one example, seal jaw assembly 110 may be aligned with and opposed by another seal jaw assembly 110, package 140 may be provided between the opposed and aligned seal jaw assemblies 110, and seal jaw assemblies 110 may compress and heat seal an end portion of package 140. Seal jaw assembly 110 may include one or more openings for receiving punch assembly 120.

As further shown in FIG. 7, an opening may be provided in the sealed portion of the package with the heated punch assembly (e.g., simultaneously with the sealing of the end portion, where the heated punch assembly transfers minimal heat to the seal jaw assemblies so that the sealed portion is not formed at too high a temperature resulting in damage to the package (block 730). For example, in implementations described above in connection with FIGS. 5 and 6A, sealed portion 610 of package 140 may be engaged by punch assembly 120 of system 100, and punch assembly 120 may form opening 620 in sealed portion 610. Opening 620 may include straight portion 622 integrally formed with first partially circular portion 624 and second partially circular portion 626. Punch assembly 120 may have minimal contact (e.g., via contact points 500, 510, and 520 of housing 300) with seal jaw 230, which may minimize conduction of substantial heat from housing 300 of punch assembly 120 to seal jaw 230. Such an arrangement may prevent punch assembly 120 from heating seal jaw 230 to a temperature that may cause seal jaw assembly 110 to be heated to an undesirable temperature (e.g., a temperature that may cause damage to package 140).

Conclusion

Systems and/or methods described herein may provide a punch assembly for forming an opening in a sealed portion of a package. The opening may enable the package to be hung on a rack. For example, in one implementation, the punch assembly may propagate heat to a punch tip (e.g., that provides the opening) while inhibiting a flow of heat to seal jaw assemblies associated with the punch assembly. The punch assembly may create a peripheral region around the opening that is less susceptible to fracture and cut-through, otherwise leading to package failure and packages falling off the spindles. The punch assembly also may ensure a consistent seal of the package (e.g., by the seal jaw assemblies) with respect to hermetic conditions within the package itself (e.g. which may impact freshness, crispiness, taste, etc. of products contained in such packages).

The foregoing description provides illustration and description, but is not intended to be exhaustive or to limit the embodiments to the precise form disclosed. Modifications and variations are possible in light of the above teachings or may be acquired from practice of the invention.

For example, while a series of blocks has been described with regard to FIG. 7, the order of the blocks may differ in other implementations. Further, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system for sealing a package that includes an article, the system comprising:
   two seal jaw assemblies provided opposite to one another, the two seal jaw assemblies being to seal an end portion of the package;
   a punch assembly provided in one of the two seal jaw assemblies, the punch assembly comprising:
      a housing,
      a heat sink retained by and extending outward from the housing, the heat sink including a punch tip that is to provide an opening in the sealed end portion of the package, and
      a coil heater contacting the heat sink to provide heat to the heat sink and the punch tip,
      the heat sink including one or more first portions and a second portion, the one or more first portions being in contact with the housing and the second portion not being in contact with the housing to prevent heat transfer from the heat sink to the one of the two seal jaw assemblies.

2. The system of claim 1, where the punch tip comprises a heated punch tip that burns the opening in the sealed end portion of the package.

3. The system of claim 2, where the punch assembly further comprises:
   a thermocouple to measure a temperature associated with the heated punch tip.

4. The system of claim 3, where the thermocouple includes a first metal portion and a second metal portion, the first metal portion being different than the second metal portion.

5. The system of claim 1, where the punch tip comprises a thermally conductive material.

6. The system of claim 4, where the thermally conductive material comprises one or more of:
   stainless steel,
   copper,
   iron,
   nickel,
   zinc,
   brass,
   bronze, or
   aluminum.

7. The system of claim 5, where the coil heater provides heat to the thermally conductive material of the punch tip.

8. The system of claim 5, where the thermally conductive material contacts at least one surface of the coil heater.

9. The system of claim 8, where the coil heater heats the thermally conductive material along an entire length of the thermally conductive material.

10. The system of claim 1, where the opening provided in the sealed end portion of the package is substantially the same size and shape as the punch tip.

11. The system of claim 1, where the opening provided in the sealed end portion of the package comprises:
    a straight portion that includes a first end and a second end;
    a first partially circular portion integrally connected to the first end of the straight portion; and
    a second partially circular portion integrally connected to the second end of the straight portion.

12. The system of claim 1, where the housing has minimal contact with the one of the two seal jaw assemblies in order to minimize conduction of heat from the housing to the one of the two seal jaw assemblies.

13. A punch assembly for a form, fill, and seal machine that provides a package that includes a sealed end portion and contains an article, the punch assembly comprising:
    a housing;
    a heat sink retained by and extending outward from the housing, the heat sink including a punch tip that is to provide an opening in the sealed end portion of the package; and
    a coil heater contacting the heat sink to provide heat to the heat sink and the punch tip,
    the heat sink including one or more first portions and a second portion, the one or more first portions contacting the housing and the second portion not contacting the housing to prevent heat transfer from the heat sink to a seal jaw assembly of the form, fill, and seal machine.

14. The punch assembly of claim 13, where the punch tip comprises:
    a straight body portion that includes a first end and a second end;
    a first curved portion integrally connected to the first end of the straight body portion; and
    a second curved portion integrally connected to the second end of the straight body portion.

15. The punch assembly of claim 13, where the punch assembly further comprises:
    a thermocouple to measure a temperature associated with the punch tip.

16. The punch assembly of claim 15, where the thermocouple includes a first metal portion and a second metal portion, the first metal portion being different than the second metal portion.

17. The punch assembly of claim 13, where the punch tip comprises a heated punch tip that burns the opening in the sealed end portion of the package.

18. The punch assembly of claim 13, where the punch tip comprises a thermally conductive material.

19. The punch assembly of claim 18, where the thermally conductive material contacts at least one surface of the coil heater and the coil heater heats the thermally conductive material along an entire length of the thermally conductive material.

20. The punch assembly of claim 13, where coil heater uniformly heats the heat sink and punch tip.

21. The punch assembly of claim 13, where the housing has minimal contact with the seal jaw assembly in order to minimize conduction of heat from the housing to the seal jaw assembly.

22. A method for sealing a package and for providing an opening in the package, the method comprising:
   providing an end portion of the package between two seal jaw assemblies, one of the two seal jaw assemblies including a punch assembly;
   sealing, via the two seal jaw assemblies, the end portion of the package to create a sealed portion integrally formed with a body portion; and
   providing, simultaneously with the sealing, an opening in the sealed portion with the punch assembly,
   the punch assembly including a housing and a heat sink retained by and extending outward from the housing,
   the heat sink including a punch tip that provides the opening in the sealed portion, and
   the heat sink including one or more first portions and a second portion, the one or more first portions contacting the housing and the second portion not contacting the housing to prevent heat transfer from the heat sink to the one of the two seal jaw assemblies.

23. The method of claim 22, where the opening enables the package to receive a hook of a rack for display to a customer.

24. The method of claim 22, where the opening enables the package to be torn open without tearing the package towards the body portion.

25. The method of claim 22, where the punch tip includes a straight body portion that includes a first end and a second end, a first curved portion integrally connected to the first end of the straight body portion, and a second curved portion integrally connected to the second end of the straight body portion.

* * * * *